Dec. 20, 1927. C. STEIN. Re. 16,826

RECUPERATIVE FURNACE

Original Filed April 30, 1919 3 SHEETS—SHEET 1.

Inventor:
Charles Stein
By Chas. J. O'Neill
Atty.

C. STEIN.

Dec. 20, 1927.

Re. 16,826

RECUPERATIVE FURNACE

Original Filed April 30, 1919

3 SHEETS—SHEET 2.

Inventor.

by Charles Stein

Chas. J. O'Neill

Atty.

Dec. 20, 1927. C. STEIN. Re. 16,826

RECUPERATIVE FURNACE

Original Filed April 30, 1919 3 SHEETS—SHEET 3.

Inventor.
Charles Stein
By Chas. J. O'Neill
Atty

Reissued Dec. 20, 1927. Re. 16,826

UNITED STATES PATENT OFFICE.

CHARLES STEIN, OF PARIS, FRANCE, ASSIGNOR TO SOCIETE CH. M. STEIN & CIE., OF PARIS, FRANCE, A CORPORATION OF FRANCE.

RECUPERATIVE FURNACE.

Original No. 1,350,624, dated August 24, 1920, Serial No. 293,820, filed April 30, 1919. Application for reissue filed October 5, 1927. Serial No. 224,247.

The present invention has for its object a vertical continuously recuperative furnace intended more particularly for the reheating of ingots to the temperature necessary for forging or rolling.

The invention is described hereinafter in detail with reference to the accompanying drawings which represent, by way of example and diagrammatically, a constructional form of the furnace.

Figure 1:
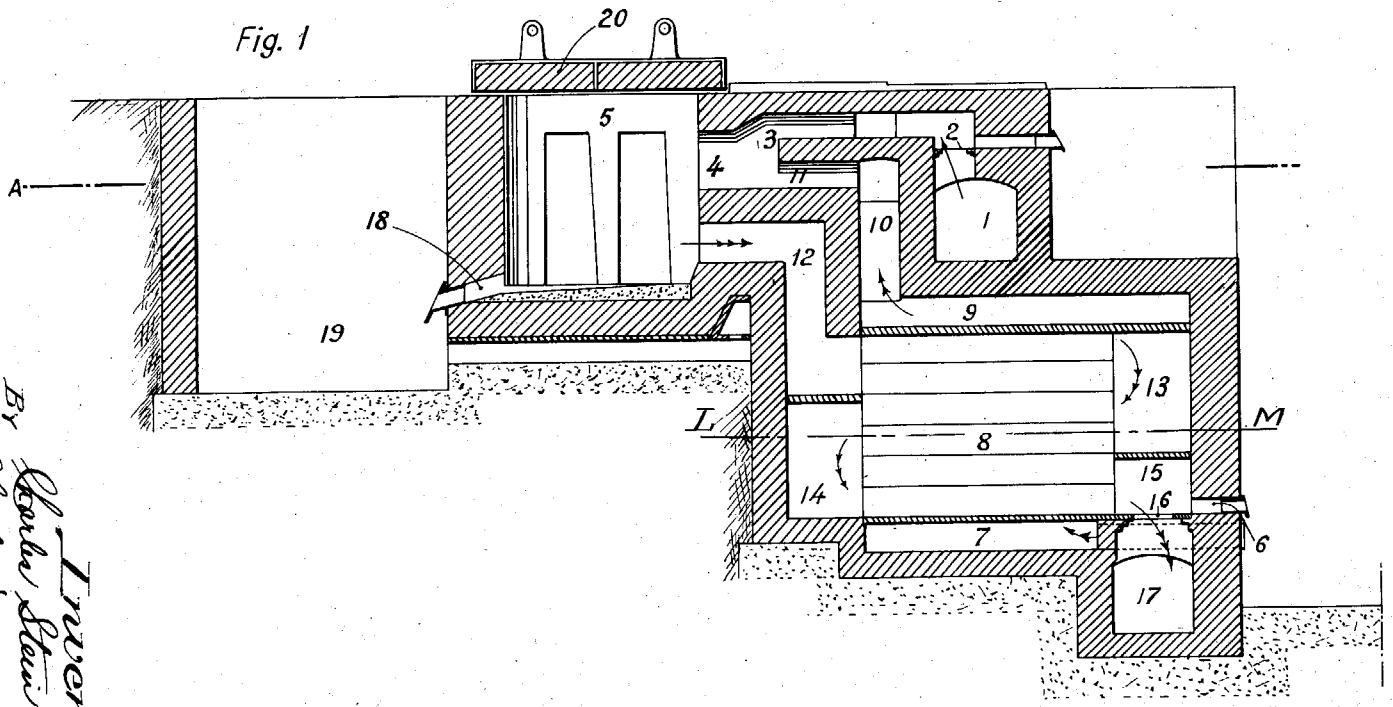
Figure 1 represents the furnace in vertical section on the line C, D, E, F of Fig. 2.
Figure 2:
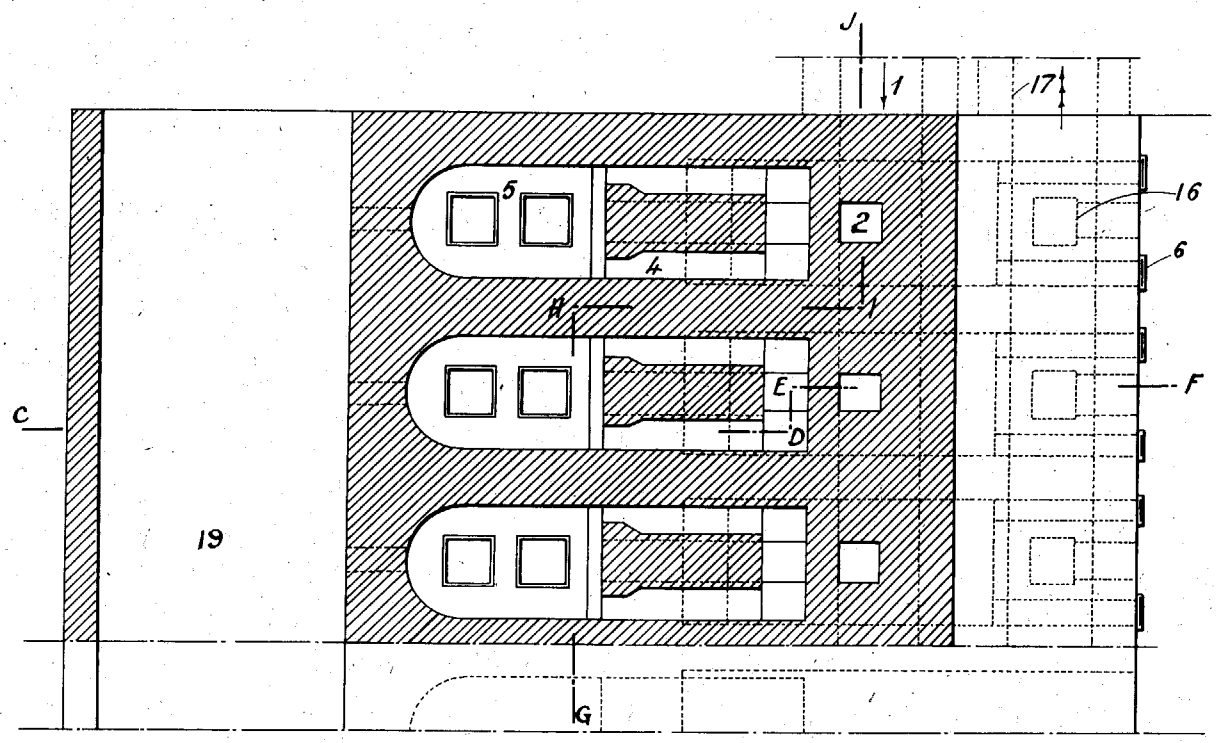
Fig. 2 represents the furnace in plan on the section A, B of Fig. 1.
Figure 3:
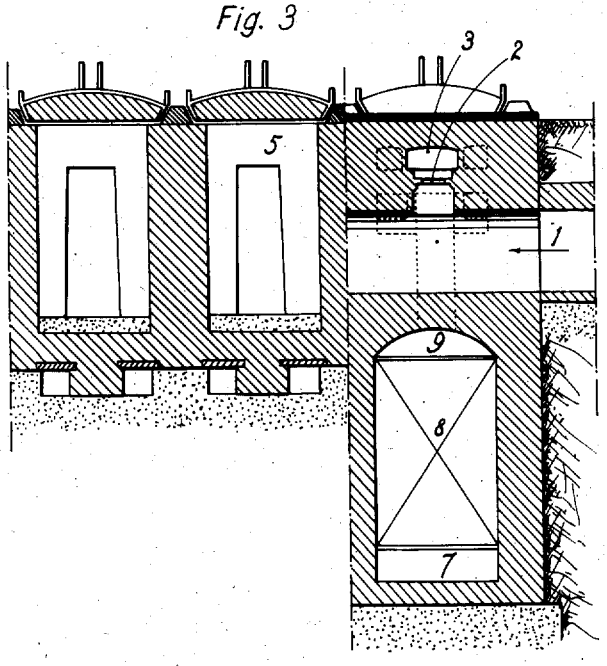
Fig. 3 represents a vertical section of Fig. 2 on the line G, H, I, J.
Figure 4:
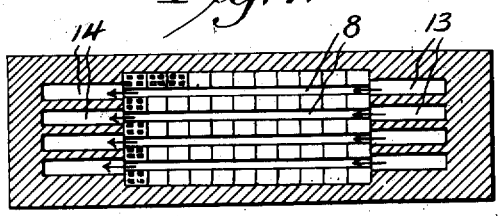
Fig. 4 shows an upper or plan view in detail illustrating the construction of the recuperator.

In the drawing, 1 is a gallery by which the gases of combustion arrive and which may be common to a series of furnaces of the same type, 2 is a damper for regulating the flow of the gases by the passages 3 and 4 into the working chamber or hearth 5, 6 is a flue by which the air to support combustion arrives which passes through the passage 7, the recuperator 8, and the passages 9, 10 and 11 to be mixed in 4 with the gases and cause the combustion thereof. The products of this combustion are evacuated through the flues 12 through the recuperator 8 and the flues 13, 14 and 15 and pass into the smoke collector 17. The recuperator is a hollow tile like construction, arranged in spaced vertical tiers, allowing for the transverse passage of the products of combustion and by reason of the hollow formation of the units comprising the tiers, vertical openings are provided for the passage of air, as clearly shown in Fig. 4. The regulation of the draft is produced by a damper located at 16. The hearth communicates by the passage 18 with the cleaning pit 19.

The action of the furnace is as follows:

The gas arrives by the gallery 1, passes through 2 and 3 up to the entrance to the hearth at 4, and at the same time, the air to support combustion enters by the passages 6 and 7, passes through the recuperator 8 where it is heated, then passes through the passages 9, 10 and 11 to arrive at 4 where it meets the gas and mixes with this latter to produce suitable combustion and heat the ingots which are placed in the hearth 5. The products of the combustion pass by the passages 12, 13 and 14, heat the air which circulates in the opposite direction in the recuperator and pass into the passage 15 whence they are evacuated into the smoke collector 17. The supplies of gas and air and also the exit of the smoke can be regulated by means of special dampers.

In view of the construction of the furnace as illustrated by the drawings, it will be apparent that the mixtures of air and combustible gases issuing from the ports 3 and 4 will enter the hearth 5 at its ends and pass along the top sides thereof towards the outer end gradually bending downward and passing along the bottoms and the side walls back to the exit conduits 12. Owing to the fact that the hearth is in the form of a horse shoe, the burning gases will pass along the sides thereof and curve along the ends without directly impinging on the ingots, but rather surrounding them on all sides with the flame. The natural downward motion of the cooled gases is facilitated and augmented by the arrangement of the openings to the conduits 4 and 12, so that the incoming gases enter at a point higher than the outgoing gases. The latter pass downwardly through the recuperator while the air coming in through the port 6 passes upwardly through the recuperator into the passage 10 and thence to the passages 4. Furthermore, by reason of the arrangement of the flues 3 and 4 and the deflecting walls leading from the flues 3 downwardly into the flues 4, the gases will be mixed and combustion therefore started before they emerge from the flues 4 into the hearth chamber 5, this action being of advantage in heating the ingots on all sides of the hearth equally.

This continuous recuperative furnace possesses over the inversion type of furnace generally adopted, the advantage that it is of more simple construction and consequently more economical.

In these arrangements the cleaning pit is completely separated, the recuperator is situated completely outside the hearth, the supplies of gas, and secondary air and the exit of the smoke are on the other side of the cleaning pit, and can be regulated, each by a special damper.

The arrangement of this furnace permits of its being constructed in batteries of indefinite number, and each furnace can be regulated or extinguished individually.

I claim:

1. A vertical furnace of the class described, comprising a hearth, means for admitting and burning therein a combustible mixture of air and gas, means for exhausting the products of combustion therefrom, a recuperator through which the incoming air passes and through which the outgoing products of combustion pass for heating said air, and a smoke collector for the final exhausting of the products of combustion provided with means for regulating said exhaust.

2. A vertical furnace of the class described, consisting of a number of complete, separate and independent units having in common, a cleaning pit, a gas supply gallery and smoke collector, each of said units comprising a hearth, means for admitting therein a combustible mixture of gas and heated air, means for exhausting the products of combustion therefrom, a recuperator through which the incoming air passes and through which the outgoing products of combustion pass for heating said air, and means for cutting out one or more of the separate units without interfering with the continuous operation of the remaining units and the furnace as a whole.

3. A vertical furnace of the class described, consisting of a number of complete, separate and independent units having in common a gas supply and smoke collector, each of said units being provided with a hearth, passage-ways connecting said gas supply with a mixing chamber adjacent the hearth, an air passage-way communicating with said mixing chamber, a recuperator through which the air passes before entering said air passage-way, another passage-way leading from the hearth to the recuperator for conducting the products of combustion therethrough, said recuperator so constructed and positioned that the air will pass upwardly and the products of combustion downwardly, and regulating means for the admission of the gas to the mixing chamber and also for the admission of the air to the recuperator and the exhausting of the products of combustion from said recuperator, the whole forming a furnace of continuous operation.

4. A vertical furnace of the class described, comprising a hearth, means for admitting and burning therein a combustible mixture of air and gas, means for exhausting the products of combustion therefrom, said admitting means and exhausting means being both located in the same sidewall of the furnace, a recuperator through which the incoming air passes and through which the outgoing products of combustion pass for heating said air, and a smoke collector for the final exhausting of the products of combustion provided with means for regulating said exhaust.

5. A vertical furnace of the class described, comprising a hearth, means for admitting and burning therein a combustible mixture of air and gas, means for exhausting the products of combustion therefrom, said admitting means and exhausting means being both located in the same sidewall of the furnace and said admitting means being located above the exhausting means, a recuperator through which the incoming air passes and through which the outgoing products of combustion pass for heating said air, and a smoke collector for the final exhausting of the products of combustion provided with means for regulating said exhaust.

6. A furnace as set forth in claim 2 wherein means is provided in connection with each unit for regulating the rate at which the products of combustion are exhausted therefrom.

7. A furnace as set forth in claim 2, wherein said admitting and exhausting means are both located in one sidewall of the furnace, and said cleaning pit is located beyond the opposite sidewall, together with passage-ways adapted to afford communication between said cleaning pit and the respective hearths.

8. A vertical furnace for the purpose described comprising a hearth, means for admitting and burning near the top of the hearth a combustible mixture of air and gas, means for exhausting the products of combustion therefrom substantially directly below the place of admission of the said combustible mixture, a recuperator through which the incoming air passes and through which the outgoing products of combustion pass for heating said air, a smoke collector for the final exhausting of the products of combustion, and means for regulating said exhaust.

9. A vertical furnace for the purpose described comprising a hearth, means for admitting near the top of the hearth and burning therein a combustible mixture of air and gas, means for exhausting the products of combustion therefrom near the bottom of the hearth, a recuperator through which the incoming air passes and through which the outgoing products of combustion pass for heating said air, a smoke collector for the final exhausting of the products of combustion, and means for regulating said exhaust.

Executed this 21st day of September, 1927.

CHARLES STEIN.